United States Patent Office 2,875,035
Patented Feb. 24, 1959

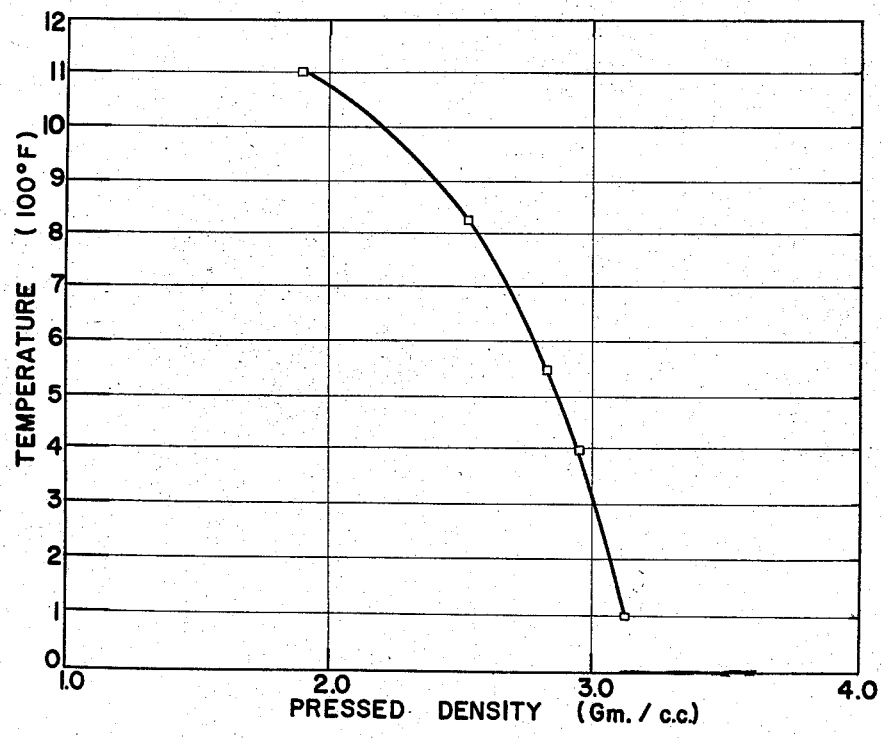

2,875,035

PROCESS OF ELIMINATING PYROPHORISM IN ARTICLES FORMED FROM CHEMICALLY REDUCED METALLIC IRON

Marion Ernest Graham, Parma, William A. Reed, West Richfield, and Roger A. Holman, Cleveland Heights, Ohio, assignors to Republic Steel Corporation, Cleveland, Ohio, a corporation of New Jersey Application April 5, 1955, Serial No. 499,422

2 Claims. (Cl. 75—34)

The present invention relates to a process of eliminating pyrophorism in articles formed from chemically reduced metallic iron and for making non-pyrophoric articles by powder metallurgy methods starting with metallic iron, usually in the form of powder or a frangible sponge which was produced by chemically reducing some compound or compounds of iron by the use of a gaseous reducing agent or agents and under conditions such that the reduced metallic iron may be pyrophoric.

It is recognized that any reduced metallic iron, such as iron produced by reducing iron oxide with hydrogen, will be spontaneously combustible if exposed to air or an oxygen-containing gas at any relatively high temperature. What is meant in the present case by "pyrophoric" or the characteristic of "pyrophorism" is not merely that, but rather the characteristic of some metallic iron, which is reduced as aforesaid from a compound of iron by the use of a gaseous reducing agent or agents and which is thereafter cooled substantially to room temperature under non-oxidizing conditions. Even after such iron is cooled completely down to room temperature and if it is thereupon exposed to the air or some oxygen-containing gas, some of this iron is so sensitive to oxidation that it will combine with oxygen by spontaneous combustion. This is the condition which is referred to herein as "pyrophorism"; or the material which is capable of burning in this way is termed "pyrophoric."

It is also recognized that if iron oxide is reduced at temperatures up to about 600° C. (1112° F.), the reduced material will probably be pyrophoric in accordance with the above definition. Iron which is reduced from the oxide at temperatures between about 600° C. (1112° F.) and about 700° C. (1382° F.) may be pyrophoric, so that it cannot be reasonably assured that it will not be subject to spontaneous combustion if exposed to the air after careful cooling as aforesaid. This material also is so sensitive that the process of the present invention is applicable thereto. On the other hand, when a compound of iron, such as iron oxide, is reduced at temperatures above about 750° C., there is little or no danger that the reduced product will be pyrophoric. Under these circumstances, the process of the present invention is not necessary, so that the present invention is not intended to be applied to this type material.

The prior art has encountered the difficulty of pyrophorism, but in all instances, as far as is known, has resorted to the expedient of embedding or coating the pyrophoric iron in a non-gaseous organic material, e. g., an organic liquid as acetone or ether, in which the iron powder can be immersed prior to the compacting thereof. Such an organic material surrounds the powder particles and prevents contact thereof with the atmosphere. Another expedient which has been resorted to by the prior art was to treat articles formed from pyrophoric powdered metals following the completion thereof, with a relatively solid organic material to close the pores and seal the metal body against the access of oxygen. Such sealing materials mentioned in the prior art comprise pitches, resins, greases, plastics or the like. The present invention overcomes the difficulty of pyrophorism by resorting to straight compacting of the iron powder without using any organic coating materials as aforesaid.

The present invention provides for overcoming existing or possible pyrophorism by compacting the relatively low bulk density iron material by the application of pressure, so as to raise the bulk density thereof at least to some minimum critical value. This value, as will be set forth in more detail hereinafter, is not an absolute value for all conditions of compacting, but rather is a function of the compacting temperature. Thus, at temperatures of about 100° F., the critical density is indicated to be something over three. At higher temperatures the critical density is progressively less in accordance with a curve which has been determined from a large number of tests and hence represents the consensus of a large number of empirical results. This invention is limited to the process step of carrying on the compacting operation at a temperature substantially above 100°, so as to take advantage of the critical relationships found to exist as aforesaid, to assure that the product will be in the non-pyrophoric area and to minimize the amount of pressure required to attain a given density.

The invention will be understood by reference to the accompanying drawing, the single figure of which is a curve showing an empirical relationship which has been determined as a part of the present invention between the temperature of the compacting on the one hand and the minimum density required to assure a non-pyrophoric product on the other.

The present process may be carried out on any reduced iron material prepared, for example by chemically reducing iron oxide by the use of a reducing gas or mixture of such gases and where the product is or may be pyrophoric as above defined. The composition of the material to be worked upon in accordance with the present invention is one which is principally iron and in fact has such a high proportion of iron that the pyrophoric character of the iron present is a critical factor. Other materials in admixture and/or alloyed with the iron are not precluded in accordance with the present invention as long as pyrophorism is or may exist in the starting material and it is desired to eliminate this characteristic. It is also contemplated that the starting material may contain small, usually substantially trace amounts, of one or more of the oxides of iron or of some other metal present which is detectible as "hydrogen loss," i. e. the loss in weight of a sample held at a predetermined relatively high temperature in an atmosphere of substantially pure hydrogen for a predetermined time, the time-temperature, etc., being all definite standards in the art of powder metallurgy. Various samples of iron with different hydrogen losses as thus defined have been tested.

The starting material in accordance with the present invention may also be any one or more of the following: (a) iron powder which is or may be pyrophoric, (b) pellets of iron, each of which consist essentially of a frangible sponge mass, and (c) relatively larger masses of iron in frangible sponge form. As far as is known, the only iron bodies which are or may be pyrophoric in accordance with the definition given above are those having a relatively low bulk density.

Pyrophorism appears to be a characteristic of material having a relatively high surface area with respect to its mass, so that massive bodies of iron are not subject to this characteristic. As a result, and without going into the theory of why a body of iron is or is not pyrophoric, it has been found in accordance with the present invention that when a body of iron, which is or may be pyrophoric, is subjected to compacting pressure, so as to increase its density to a certain minimum critical amount, this act alone is effective to eliminate the pyrophoric character of the material.

It was first thought that there was some particular density which would serve in all cases to eliminate pyrophorism. This is apparently true to the extent that if the density chosen be made high enough, the product is not pyrophoric. On the other hand, it has been determined from a large number of tests made in the development of the present invention that the critical density is not an absolute value, but rather is a function of the temperature at which the compacting takes place. The relationship of these two variables is shown in the accompanying drawing. Inasmuch as this relationship is an empirical one, it is of necessity included in the claims in this case as a characteristic feature of the present invention.

It is, of course, essential that spontaneous combustion of the iron powder be prevented until it has been precluded by the practice of the present invention. Thus, it is essential that the starting material for the present invention, if pyrophoric, so that the prevention of pyrophorism is necessary, be kept under non-oxidizing conditions until it has been compacted in accordance with this invention. It is contemplated that the material, between the time when it is formed by reduction as aforesaid and the time that the present process is carried out thereon, may be at any temperature or temperatures including being cooled to or substantially to room temperature and thereafter heated to the desired temperature at which the compacting operation in accordance with the present invention is to be carried on. Alternatively, it may be desired, as a heat-saving process step, to keep the material between the higher temperature at which it is formed and the relatively lower temperature at which it is to be compacted, so that the material need not be cooled and then reheated prior to the compacting step.

It is, of course, necessary to keep the reduced iron out of contact with any oxygen-containing gas, or, in other words, under non-oxidizing conditions from the time it is prepared as a reduced material and up to and usually including the compacting step per se, so that pyrophorism or spontaneous oxidation of this iron will not occur while it is potentially possible and until it is made substantially impossible by the practice of the present process in compacting the iron to a desired density and shape.

It is contemplated in accordance with the present invention that the compacting operation per se may be effected in a number of different ways. For example, it may be carried out by a straight pressing operation, with the starting material, for example iron powder, placed in a suitable die and made uniform in density, for example, by agitation or jiggling the die, then compacted by a straight press plunger type operation. Such a process is within the purview of the present invention as long as the pressed product of this process has the necessary density in accordance with the teachings of the present invention. Apparatus for the practice of such a process is conventional and thus need not be illustrated.

On the other hand, it is also contemplated that the iron material, for example either powder or pellets or a mixture of the two, may be supplied to a pair of rolls, usually arranged with their axes horizontal and one beside the other on the same level, and where the rolls are effective substantially continuously to compact the starting material into the form of a sheet having the necessary density as aforesaid. This is a preferred form of the present invention. Again the apparatus in question is so well known that illustration is deemed unnecessary.

It will be noted that the critical densities in accordance with the present invention are far short of 100% density, i. e. the density which would be attained if the metal in question were melted together and cooled from a fused mass, so that all air spaces were eliminated. It is not precluded in accordance with the present invention that the density shall be raised to one approaching or approximating full density as long as the density at least equals or exceeds the critical density at the compacting temperature used as shown in the accompanying drawing. It is further contemplated that the present invention may be practiced to give a minimum density, effective to eliminate pyrophorism in accordance with the present invention; and then the resulting product may be further worked by mechanical or other means to increase the density, for example, by one or more additional roll passes, so as to make a final product, such as a sheet of metal, which will approximate or approach full density. On the other hand, the present invention may be effected by a single roll pass as long as the product of that roll pass is one having at least the critical density shown in the accompanying drawing corresponding to the temperature at which the initial compacting is effected.

While there is herein shown and described certain essential features of the present invention and some alternatives have been described, it is contemplated that other alternatives may occur to those skilled in the art from the foregoing disclosure. All such equivalents are to be considered as included within the scope of the appended claims unless positively and specifically precluded by the terms of such claims, the claims to be construed validly as broadly as the state of the prior art permits.

What is claimed is:

1. The process of making shaped non-pyrophoric iron articles by a powder-metallurgy method, comprising the steps of reducing a compound of iron by treating such compound with a gaseous reducing agent to produce metallic iron under conditions such that the metallic iron produced thereby may be pyrophoric even after cooling to room temperature under non-oxidizing conditions; compacting said metallic iron at a temperature substantially above 100° F. and to a selected shape and to a density which is at least as great as that representing the critical density corresponding to the temperature at which said metallic iron is compacted in the density-compacting temperature curve of the accompanying drawing, so as to establish compacting temperature-pressed density conditions in the area above and to the right of the curve of said drawing, while maintaining said metallic iron in a non-oxidizing atmosphere subsequent to the reduction thereof and until it is compacted as aforesaid, and thereby converting the metallic iron to a state at which it is non-pyrophoric when cooled to room temperature.

2. The process in accordance with claim 1, in which the reduced metallic iron is cooled, following the reducing step producing such metallic iron and prior to the compactance step, so as to bring the temperature of said metallic iron from the relatively high reducing temperature down only to the predetermined temperature at which said compacting step is to be carried on.

References Cited in the file of this patent

UNITED STATES PATENTS

| | | |
|---|---|---|
| 2,367,262 | Brassert | Jan. 16, 1945 |
| 2,651,105 | Neel | Sept. 8, 1953 |

FOREIGN PATENTS

| | | |
|---|---|---|
| 590,392 | Great Britain | July 16, 1947 |